United States Patent
Allen

(10) Patent No.: US 10,461,937 B1
(45) Date of Patent: Oct. 29, 2019

(54) HYPERVISOR SUPPORTED SECRETS COMPARTMENT

(71) Applicant: Amazon Technologies, Inc., Reno, NV (US)

(72) Inventor: Nicholas Alexander Allen, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 14/132,689

(22) Filed: Dec. 18, 2013

(51) Int. Cl.
*H04L 9/32* (2006.01)

(52) U.S. Cl.
CPC .................................. *H04L 9/3234* (2013.01)

(58) Field of Classification Search
CPC ...................................................... H04L 9/3234
USPC .......................................................... 713/189
See application file for complete search history.

(56) References Cited

U.S. PATENT DOCUMENTS

| | | | |
|---|---|---|---|
| 2004/0054933 A1* | 3/2004 | Wong | G06F 21/577 726/21 |
| 2008/0244569 A1* | 10/2008 | Challener | G06F 21/57 718/1 |
| 2009/0086979 A1* | 4/2009 | Brutch | H04L 9/0836 380/279 |
| 2009/0089860 A1* | 4/2009 | Forrester | H04L 63/12 726/3 |
| 2009/0265756 A1* | 10/2009 | Zhang | G06F 21/53 726/1 |
| 2009/0282266 A1* | 11/2009 | Fries | G06F 21/602 713/193 |
| 2010/0082991 A1* | 4/2010 | Baldwin | H04L 9/083 713/176 |
| 2011/0090915 A1* | 4/2011 | Droux | H04L 49/00 370/411 |
| 2011/0271279 A1* | 11/2011 | Pate | G06F 21/53 718/1 |
| 2011/0307705 A1* | 12/2011 | Fielder | G06F 21/62 713/181 |
| 2012/0054744 A1* | 3/2012 | Singh | G06F 21/53 718/1 |
| 2012/0179916 A1* | 7/2012 | Staker | G06F 21/53 713/189 |
| 2012/0204030 A1* | 8/2012 | Nossik | H04L 9/0822 713/168 |
| 2013/0191830 A1* | 7/2013 | Mann | G06F 9/45533 718/1 |
| 2013/0227303 A1* | 8/2013 | Kadatch | G06F 21/554 713/193 |
| 2014/0289535 A1* | 9/2014 | Gan | G06F 21/53 713/189 |

(Continued)

*Primary Examiner* — Peter C Shaw
(74) *Attorney, Agent, or Firm* — Davis Wright Tremaine LLP

(57) ABSTRACT

A secret is securely maintained on a virtualized computer system by configuring a specialized virtual machine to manage and maintain the secret on behalf of an application. When the application requests access to the secret, a controlling domain, in combination with the specialized virtual machine, validates that the application is authorized to make the request and that the application has not been compromised prior to making the request. If the request is validated, the controlling domain and the specialized virtual machine fulfill the request by providing the application with access to the secret.

23 Claims, 9 Drawing Sheets

(56) References Cited

U.S. PATENT DOCUMENTS

2015/0067763 A1\* 3/2015 Dalcher .............. G06F 21/566
            726/1
2016/0373530 A1\* 12/2016 Duda ................... H04L 41/00
2018/0063178 A1\* 3/2018 Jadhav ............. H04L 63/1433

\* cited by examiner

HYPERVISOR SUPPORTED SECRETS COMPARTMENT

BACKGROUND

Modern computer systems place high importance on system security. In many computer systems, and especially those involving virtualized computing environments where a plurality of guest virtual machines may be hosted on shared physical host machines, security of data within a virtual machine instance or between host machine instances may become a concern. An application running within a virtual machine instance may selectively protect secrets from code running on other virtual machine instances on the same host machine and may also selectively protect secrets from code running on the same virtual machine instance. In some implementations a physical hardware module or a virtualized version of the same may exist to help facilitate protecting secrets but such implementations may require integration with host machine operating systems, virtual machine operating systems and/or controlling domains. Both physical and virtual implementations may also suffer from limited access to the shared module resource. Because, in many implementations, a single host system supports multiple guest operating systems, and because a single computing environment may have many host systems, service access limitations can adversely affect a large number of guest virtual machines. Additionally, as system complexity increases over time, so too does the need for better security solutions.

BRIEF DESCRIPTION OF THE DRAWINGS

Various embodiments in accordance with the present disclosure will be described with reference to the drawings, in which.

DETAILED DESCRIPTION

Figure 1:
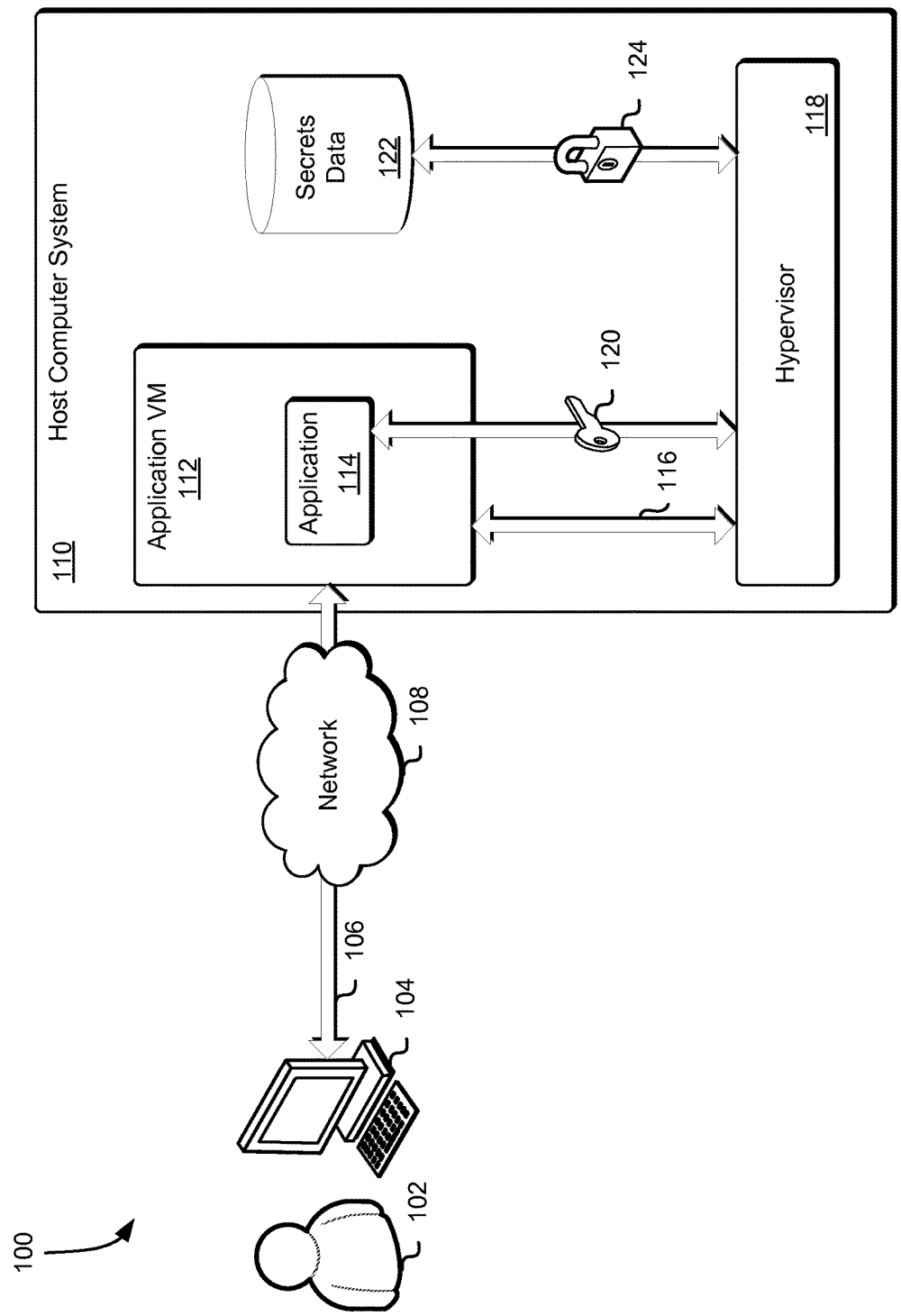
FIG. 1 illustrates an example environment where a secret may be managed for an application running on a guest virtual machine in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include methods, systems and processes for providing secure access to partitioned computer system resources to multiple virtual guest machines and/or their applications that are executing on a single physical host machine in distributed and/or virtualized computer systems and executable code operating thereon. An application running within a virtual machine (VM) instance may selectively protect secure data belonging to the application from other code running on that same VM instance or from other code running on a different VM instance, but on the same physical host machine. Applications running within VM instances may share system resources, including sharing system storage resources and may secure some or all of their data from other applications.

The methods described herein and variations thereof may be used to secure access to various system resources such as data and system devices by protecting the resources with cryptographically derived keys. In some embodiments, a passcode, such as a password, may be combined with a secret using, for example, a hash function, to secure data on the system. The passcode may be accessible to the application, but the secret may be securely stored in a secrets compartment which may also be accessible by a module configured to perform calculations with the passcode and the secret to validate access. Without both values, the data may remain secure because even with one or the other value, the hashed value may be effectively impossible to guess using, for example, brute force attacks.

For example, an application may include sensitive data that may be accessed by hashed passcodes and secrets, or by pairs of cryptographic keys or by identity and certificate pairs or by some other such cryptographic systems (referred to herein simply as "secrets"). The application may store the passcodes, or public keys or certificate identities on the host system but may store the other secret half of the cryptographic data in a location that may never be accessed by other applications on the system. Because, in shared virtual machines, resources are shared, storage resources may potentially be accessible by other application code on that host machine if appropriate safeguards are not taken. In some computing system environments, the computer system may provide access to a security module that may help facilitate secure storage and management of secrets data. Physical host computers may provide a hardware device, such as a trusted platform module (TPM), a hardware security module (HSM) or a smart card. A TPM is a security module which may be configured to generate cryptographic keys and to manage storage and access for cryptographic keys. An HSM is a computing device which is also configured to store and manage cryptographic keys and which may also be configured to generate keys. A smart card, in an embodiment, is a security device which may be configured to provide cryptographic secrets, such as keys and other such certificates to a requesting application. A TPM, an HSM or a smart card may contain one or more secure cryptoprocessors which are microprocessors configured to securely manage and perform cryptographic operations on behalf of a computer system. These security devices may contain a variety of security and anti-tampering measures to prevent unauthorized access. Virtualized computer systems may provide trusted VM instances with access to hardware TPMs, HSMs or smart cards or may provide virtual TPMs, HSMs or smart cards to be used by those systems and the applications running thereon. Taking advantage of such a virtualized security device may be problematic in some systems because they may require assistance from the guest operating system to support the security device including, but not limited to, specialized drivers, trusted users, file system alterations and other such guest operating system changes. Additionally, if a large number of applications and/or guest VM instances require access to the virtualized security device, resource contention can be a problem, limiting access to the hardware and potentially causing bottlenecks that may lead to application and/or system slowdown.

Techniques described and suggested herein include methods, systems and processes for providing secure access to partitioned computer system resources by providing an application with functionality to access a secure hypervisor-managed secrets compartment to contain and/or manage secrets without requiring guest operating system support. The application may use a hypervisor-managed secrets compartment to store the secrets data and may communicate with the hypervisor-managed secrets compartment to create, store, access, and otherwise manage its secrets. In an embodiment, a hypervisor is a controlling domain running on a host computer system that may provide access to computer system resources for guest virtual machine instances and their applications also running on the host computer system. A hypervisor typically has direct access to the host computer system resources and provides scheduled access by guests to those resources. For example, it is the hypervisor that provides system memory to guest computer systems and also manages that memory by reclaiming memory from the guest computer systems in the event that system memory becomes scarce. A hypervisor may also be called a controlling domain or domain-zero (DOM0) and typically runs as a privileged domain.

A hypervisor-managed secrets compartment, in an embodiment, is a module and/or service under the control of the hypervisor which may be configured to at least receive requests from applications running on guest virtual machines under the control of the hypervisor to provide various services and/or capabilities for the secrets associated with the applications. A hypervisor-managed secrets compartment may be comprised of one or more storage areas, processes and/or other such resources. The hypervisor-managed secrets compartment may run within, or under the control of, the hypervisor and may only be accessible by the hypervisor. A number of requests may be issued by applications associated with the secrets data. For example, an application may request the creation of a new secret that may be stored in the hypervisor-managed secrets compartment. This new secret may then be used to sign, encrypt and/or decrypt a data parameter, thus keeping that data parameter secure.

A hypervisor-managed secrets compartment may be configured to provide secure secrets storage for applications running on guest VM instances with minimal alterations to the guest operating system by keeping most of the functionality within the hypervisor and facilitating utilization of the secrets compartment by guest applications using hypervisor application programming interface (API) calls. When an application running on guest VM instance is launched, it may be launched with launch metadata indicating that the application may require access to the hypervisor-managed secrets compartment. An application running on a guest VM instance may also be launched with launch metadata indicating the scope and type of access that is required, as well as metadata indicating authorized users, methods of authentication, privileges of the application and/or other such metadata. The application may be launched within the guest VM instance and without direct access to the secrets data.

As a result of launching an application with requested access to the hypervisor-managed secrets compartment, the hypervisor may, in some embodiments, construct a second guest instance (a secrets management VM instance) based at least in part on the secrets metadata. In some embodiments, the secrets management VM instance may be hidden from the other VM instances on the host computer system and in some embodiments, the secrets management VM instance may appear as any other instance on the host computer system (the name "secrets management VM instance" is meant to indicate that it is a VM instance that contains secrets, and not that it is necessarily hidden). The secrets management VM instance may also be referred to herein as a secret VM instance, a secret instance and/or other such references. The secrets management VM instance may be a lightweight or simplified instance configured with the minimal functionality required to manage secrets protected by the hypervisor-managed secrets compartment and, in some embodiments, to manage data and/or other resources protected by the secrets. The secrets management VM instance may run within, run under the control of, or be considered part of the hypervisor-managed secrets compartment. In some embodiments, the hypervisor may instantiate a new secrets management VM instance for each application launched. In some embodiments, the hypervisor may instantiate a secrets management VM instance that is shared by a plurality of applications and that is configured to receive metadata from instance launches and to manage secrets and/or protected data for a plurality of applications. The hypervisor may receive the secrets management VM instance metadata from the launched application or it may receive the secrets management VM instance metadata from an independent repository of such images, and may select the appropriate secrets management VM metadata based on the application and/or guest VM instance data. In some embodiments, the secrets management VM instance may be instantiated with secure access, provided by the hypervisor, to a repository of secrets that may be shared by one or more of a plurality of applications. In such embodiments, the metadata associated with the secrets management VM instance may include metadata regarding access to the shared repository of secrets and may also include metadata regarding which of the secrets in the shared repository of secrets that the secrets management VM instance may access.

The hypervisor-managed secrets compartment, upon determining that the application is running on the guest VM instance, and upon determining that the secrets management VM instance is also running in its separate domain, may then initiate communications channels. The hypervisor-managed secrets compartment manages all communications between the application on the guest VM instance and the secrets management VM instance. The hypervisor-managed secrets compartment may manage communications by, for example, providing the application on the guest VM instance with an identifier to facilitate communication and which may be based in part on application identifiers, or virtual machine identifiers, or other such identifiers. In some embodiments, the hypervisor may provide the application running on the guest VM instance with a uniform resource locator (URL) or a uniform resource identifier (URI) that may refer to a service such as a webserver on the secrets management VM instance that the application running on the guest VM instance may use the URL or URI to access the secrets management VM instance. In such embodiments, the hypervisor-managed secrets compartment may intercept all communications to the provided URI or URL to prevent direct communications between the application on the guest VM instance and the secrets management VM instance. In such embodiments, the service on the secrets management VM instance may also be configured to intercept all communications and request intervention from the hypervisor-managed secrets compartment as needed.

Periodically, the hypervisor-managed secrets compartment and/or the secrets management VM instance may receive one or more requests from the application, using the communications identifier, URL or URI to use and/or otherwise manage the secrets stored within the secrets management VM instance. An application may, for example, create a new secret that may be stored in the secrets management VM instance for later use. The application may also use one or more of the secrets to sign a piece of data for storage within the secrets management VM instance, or to encrypt a piece of data using one or more of the secrets for storage either within the secrets management VM instance or within the guest VM instance. The application may later decrypt that data and, if no longer needed, may destroy one or more stored secrets. As mentioned previously, a secrets management VM instance may be instantiated with one or more existing secrets which may be accessible by one or more aspects of the application without creating them anew. In addition to the example requests mentioned herein, a hypervisor-managed secrets compartment and/or the secrets management VM instance may be configured to receive requests comprised of arbitrary executable instructions allowing it to process requests not limited by a preconceived list of operations known to the hypervisor.

A hypervisor-managed secrets compartment may also be configured with additional functionality related to management of secrets management VM instances and/or functionality to manage additional access to the secrets management VM instances or the secrets data. For example, as mentioned previously, the hypervisor-managed secrets compartment may be configured to receive secrets data metadata to facilitate the launching of secrets management VM instances associated with an application running on a guest VM instance or to configure a secrets management VM instance that is shared by a plurality of applications (also referred to as a shared secrets management VM instance) to process requests from an application running on a guest VM instance. A hypervisor-managed secrets compartment may also manage the termination of secrets management VM instances such as, for example, when requested by a request or automatically when the application terminates. A hypervisor-managed secrets compartment may also be configured to manage permissions with respect to access to a secrets management VM instance, allowing providing and/or rescinding access by applications to the secrets. With such access management functionality, a hypervisor-managed secrets compartment may, in some embodiments, be able to allow multiple applications (possibly on multiple guest VM instances) access to a single secrets management VM instance. As may be contemplated, the examples of the different requests that may be received by a hypervisor-managed secrets compartment mentioned herein are merely illustrative examples and other requests may be considered as within the scope of the present disclosure.

Security of the secrets data may be increased by performing one or more authentication, authorization and/or validation steps within the hypervisor-managed secrets compartment before releasing the secret to process the request. The hypervisor-managed secrets compartment may first verify that the requesting application is one that should have access to the identifying information necessary to make a request. In some embodiments, a hypervisor-managed secrets compartment and/or a secrets management VM instance may include a good list of approved applications, approved users, approved processes and/or approved functions that are the only ones that may issue requests. A hypervisor-managed secrets compartment and/or a secrets management VM instance may also include a bad list of applications, users, processes and/or functions that are not allowed to issue requests under any circumstances. The white list and/or the black list may be a part of the launch metadata, or they may be dynamically generated as the application and the secrets management VM instance run or they may be a combination of static and dynamic data.

After verifying that the requester is authorized, a hypervisor-managed secrets compartment and/or a secrets management VM instance may next verify that the request is valid. This is an additional security measure to ensure that the secrets remain secure and prevent a malicious attacker from, for example, introducing some sort of malware into the guest VM instance to intercept a secret or the protected data or to prevent a malicious attacker from pretending to be a valid application and to intercept a secret or the protected data that way. The hypervisor-managed secrets compartment and/or the secrets management VM instance may determine that the requester is a valid requester and that it has not been tampered with by examining the state of the guest VM instance and the application running on the guest VM instance. For example, the hypervisor-managed secrets compartment and/or the secrets management VM instance may examine the processes running on the guest VM instance to see if there are any unexpected processes. Virtual machines may generally be in a predictable state when certain applications are running and so, if an unexpected process were running on the guest VM instance, it may be an indicator of a malicious attacker. By comparing one or more states of the guest VM instance against one or more predicted states which may be stored in the secrets metadata associated with a secret, the hypervisor may be able to determine if the guest VM instance and/or the application has been compromised.

For example, the call stack of an application can be examined and compared against one or more known and/or predicted call stacks to verify whether the application is operating normally or if it may have been somehow compromised. The call stack may be compared against one or more predicted call stacks to locate anomalies in executable code segments that may be present in the call stack. In some embodiments, the system may require that the call stack be identical to one of the one or more of the predicted call stacks. In some embodiments, the system may require that at least a portion of the call stack matches a corresponding portion one of the one or more predicted call stacks. In such embodiments, the system may determine that the call stack matches at least a portion of a predicted call stack if, for example, the two call stacks only differ in certain parts, or are the same within a system defined threshold, or only differ in non-critical code segments and/or some other such system defined tolerances. The system may also determine whether an application has been compromised by comparing at least a portion of one or more memory pages used by the application against a reference standard of one or more memory pages that may be used by the applications. For example, the system may contain metadata with a reference standard containing one or more allowable memory page contents and/or configurations which the system may use to determine if the application is in a state where it may have been compromised. The system may also determine whether an application has been compromised by determining that the call stack of the application only includes executable code from modules belonging to applications that are permitted applications or that the call stack does not include any executable code from modules that are restricted applications.

In some embodiments, the hypervisor-managed secrets compartment and/or the secrets management VM instance may pause the application or the guest VM instance and compare a hash of the executable instructions and/or a hash of some other known state of the application or the guest VM instance against some known and/or predicted hash value to determine a possibly compromised state. If the hypervisor-managed secrets compartment and/or the secrets management VM instance determines that the application and/or the guest VM instance have been tampered with, the hypervisor-managed secrets compartment and/or the secrets management VM instance may terminate the application, or may terminate the guest VM instance, or may raise an alarm or may take one or more other appropriate attack responses according to the system configuration. If the hypervisor-managed secrets compartment and/or the secrets management VM instance determine that the application and/or the guest VM instance have not been tampered with, the hypervisor-managed secrets compartment and/or the secrets management VM instance may process the request, using the secret as needed.

FIG. 1 illustrates an example environment 100 where a secret may be managed for an application running on a guest VM instance by a controlling domain such as a hypervisor within a host computer system environment in accordance with at least one embodiment. A user 102 may connect to a host computer system using a computer system client device 104 via a connection 106 across a network 108. The user 102 may be a person, or may be a process running on one or more remote computer systems, or may be some other computer system entity, user or process. The command or commands to connect to the computer system may originate from an outside computer system and/or server, or may originate from an entity, user or process on a remote network location, or may originate from an entity, user or process within the computer system, or may originate from a user of the computer system client device 104, or may originate as a result of a combination of these and/or other such entities.

The user 102 may request connection to one or more host computer systems 110 via one or more connections 106 and, in some embodiments, via one or more networks 108 and/or entities associated therewith, such as servers connected to the network, either directly or indirectly. The computer system client device 104 that may request access to the host computer system may include any device that is capable of connecting with a computer system via a network, including at least servers, laptops, mobile devices such as smartphones or tablets, other smart devices such as smart watches, smart televisions, set-top boxes, video game consoles and other such network enabled smart devices, distributed computing systems and components thereof, abstracted components such as guest computer systems or virtual machines and/or other types of computing devices and/or components. The network may include, for example, a local network, an internal network, a public network such as the Internet, a wide-area network, a wireless network, a mobile network, a satellite network, a distributed computing system with a plurality of network nodes and/or the like. The network may also operate in accordance with various protocols, such as those listed below, Bluetooth, WiFi, cellular network protocols, satellite network protocols and/or others.

The user 102 may request access to one or more host computer systems 110 within a distributed and/or virtualized datacenter environment such as may be provided by a computing resource service provider. The computing resource provider may also provide access to one or more computer services such as virtual machine (VM) instances, automatic scaling groups, file-based database storage systems, block storage services, redundant data storage services, data archive services, data warehousing services, user access management services, content management services and/or other such computer system services as may be running thereon. The computing resource service provider may also provide access to computer system resources such as user resources, policy resources, network resources and/or storage resources. In some distributed and/or virtualized computer system environments, the resources associated with the computer services may be physical devices, virtual devices, combinations of physical and/or virtual devices or other such device embodiments. In some embodiments, the host machines may be physical machines located within the computer system environment.

The user 102 may access an application VM instance 112 running on the host computer system 110 which may be one of one or more VM instances running on the host computer system. The application VM instance 112 may have been instantiated by the user, or may have been previously running. The application VM may be connected 116 to a controlling domain such as a hypervisor 118 which may be configured to manage and/or provide access by the application VM instance 112 to one or more system resources on the host machine including, but not limited to, access to computer system memory, access to central processing unit (CPU) time, access to disk storage, access to specialized hardware and other such resource access. In some embodiments, the hypervisor 118 may provide access to and manage the system resources on the behalf of the plurality of VM instances running on the host computer system 110.

The user may access an application 114 running on an application VM instance 112 which may be one of one or more applications running within the application VM instance 112 and which may also be one of one or more applications running on the one or more VM instances running on the host computer system. The application 114 may, in some embodiments, require access to one or more secrets such as the secrets described above herein for the purposes of protecting one or more pieces of secured data used by the application. In order to protect the secrets from access by other applications on the host computer system, the computer system may store the secrets in a secrets data 122 location maintained by the hypervisor 118. Access to the secrets data 122 is requested by the application 114 using an identifier 120 that, if verified by the hypervisor 118 may allow the release of the secret 124 from the secrets data 122 for use by the application 114. If the identifier 120 is not verified, the secret 124 may not be released for use by the application.

Figure 2:
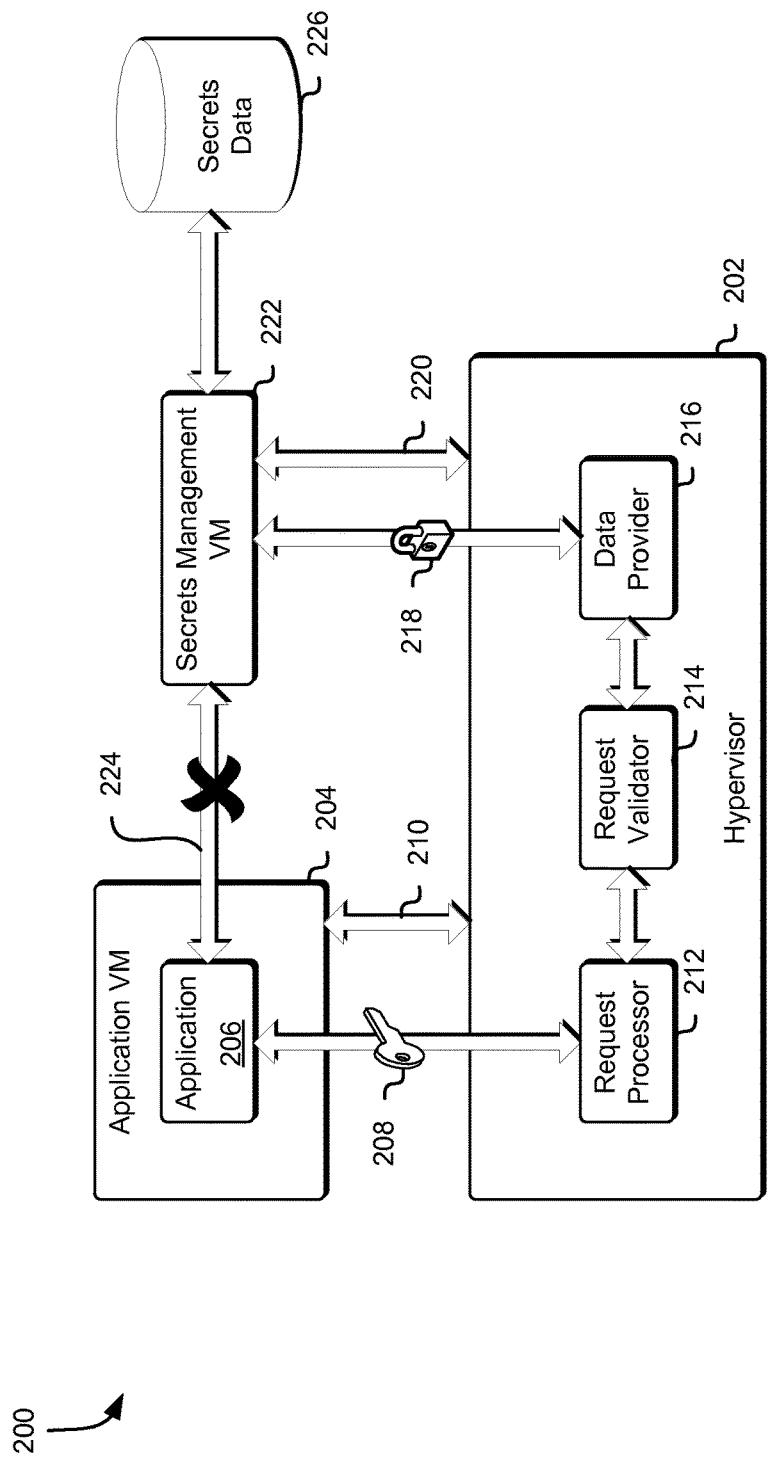
FIG. 2 illustrates an example environment where a controlling domain may manage secrets on behalf of an application and may process requests for those secrets in accordance with at least one embodiment.

FIG. 2 illustrates an example environment 200 where a controlling domain such as a hypervisor may manage secrets on behalf of an application and processes requests to access such secrets as described herein at least in connection with FIG. 1 and in accordance with at least one embodiment. An application 206 running within an application VM instance 204 running under the control 210 of a controlling domain such as a hypervisor 202 and running on a host computer system as described herein at least in connection with FIG. 1 may issue a request 208 for access to one or more secrets as needed to run the application. The hypervisor and/or a hypervisor-managed secrets compartment may instantiate one or more processes, sub-processes, systems, sub-systems or the like to receive and process the request 208 for access. In some embodiments, the hypervisor and/or the hypervisor managed secrets compartment may first receive and process the request 208 for access with a request processor 212 which may be configured at least to receive the request and to determine how it should be processed. In some embodiments, the request processor may use a request validator 214 to validate one or more aspects of the request 208 before fulfilling the request.

In some embodiments, the request validator 214 may, for example, verify first that the application 206 has authorization to issue the request 208. The request validator 214 may also verify that the request 208 is properly formatted, that the application 206 is not being faked, and that the application 206 is not being controlled by another application, process or service. The request validator 214 may engage in one or more activities to complete this verification and in the process, may communicate with and/or access the application VM instance 204, the application 206, a secrets management VM instance 222, a secrets data store 226, hardware, software or services on the host computer system and/or other such computer system entities. As may be contemplated, the types of validations described herein and the different entities that may be connected with to accomplish that validation are merely illustrative examples, and other types and/or methods of validation may be considered as within the scope of the present disclosure.

If the request 208 is validated by the hypervisor and/or the hypervisor-managed secrets compartment, a data provider 216 may then provide access to the secret 218 for use by the application. In some embodiments, the data provider may alert a secrets management VM instance 222 of the request via a connection 220 between the secrets management VM instance 222 and the hypervisor 202. The secrets management VM instance 222 may then access the correct secret from the secrets data store 226 and provide the secret 218 for use by the application. The application 206 may not have direct access 224 to the secrets management VM instance 222 to prevent tampering with the secrets management VM instance 222 and/or the secrets data store 226. In some embodiments, the application 206 and/or the application VM instance 204 may be aware of and/or have limited and/or controlled access to the secrets management VM instance 222 such as, for example, via a URL or URI across an internal network on the host machine under the control of the hypervisor 202. In such embodiments, the connection between the application 206 and the secrets management VM instance 222 may be controlled and/or managed by the hypervisor 202, the hypervisor-managed secrets compartment and/or the secrets management VM instance 222 to prevent unauthorized access by other applications, processes or services running on the host computer system.

Figure 3:
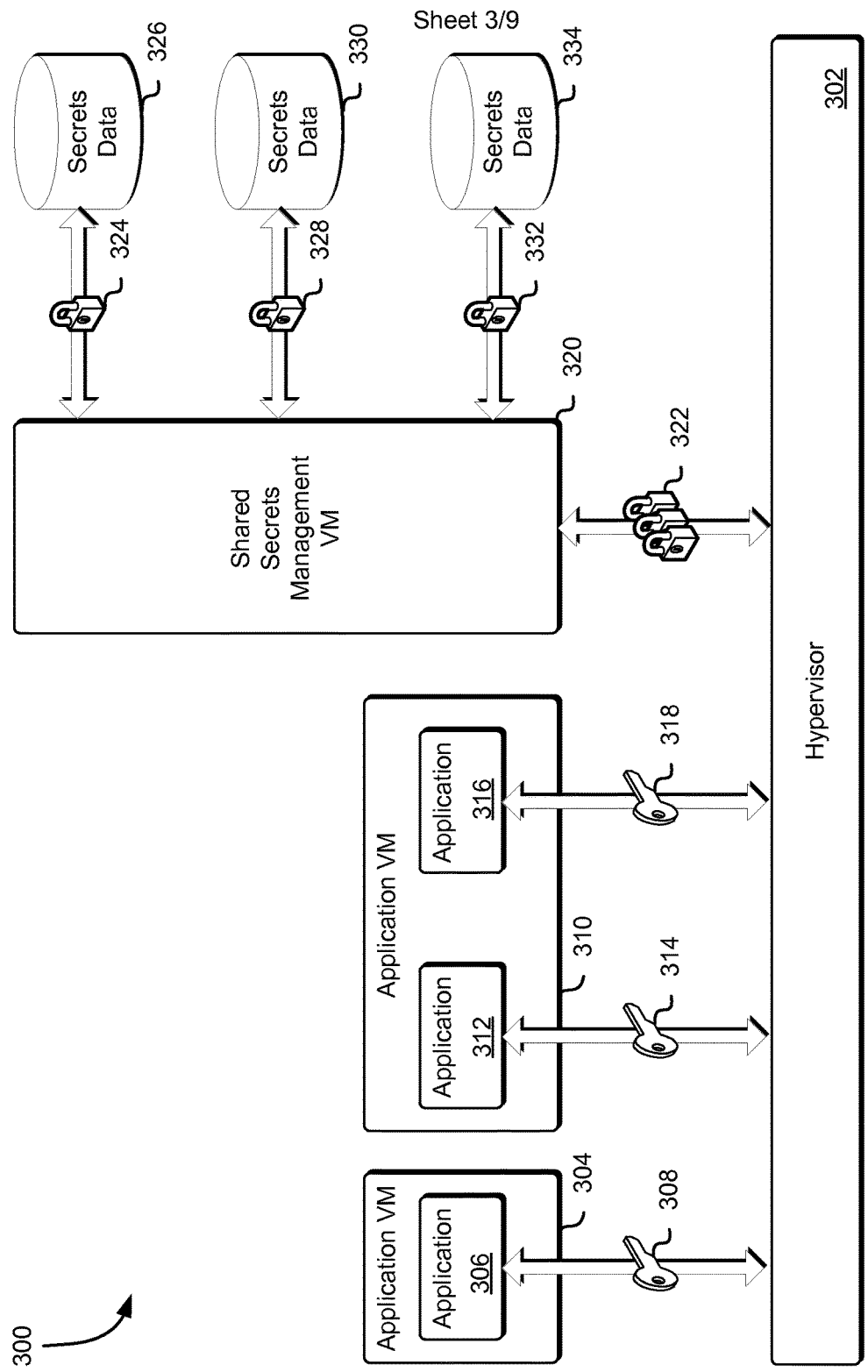
FIG. 3 illustrates an example environment where multiple applications may have secrets requests satisfied in part by a secrets management virtual machine instance that is shared by a plurality of applications in accordance with at least one embodiment.

FIG. 3 illustrates an example environment 300 where multiple applications which may require access to secrets may be running on a host computer system as described herein at least in connection with FIG. 2 and in accordance with at least one embodiment. An application 306 running within an application VM instance 304 that is running under the control of a controlling domain such as a hypervisor 302 and running on a host computer system as described herein at least in connection with FIG. 1 may issue a request 308 for access to one or more secrets as needed to run the application. The hypervisor and/or a hypervisor-managed secrets compartment may receive the request, validate the request and, if valid, satisfy the request as described herein at least in connection with FIG. 2 and in accordance with at least one embodiment. The requested secret 322 may be provided to the application 306 by a shared secrets management VM instance 320 that may be configured to store and/or manage secrets for a plurality of applications running on the host computer system. In the example illustrated in FIG. 3, the secret 324 corresponding to the request 308 for application 306 may be stored in a secrets data store 326.

As was mentioned previously herein, an application VM instance may be running more than one application that may require secrets. An application VM instance 310 may be running an application 312 and an application 316. Application 312 may issue a request 314 for access to a secret and application 316 may issue a request 318 for a secret. The hypervisor and/or the hypervisor-managed secrets compartment may validate the requests and then may determine that request 314 may be satisfied by secret 328 stored in secrets data store 330 and that request 318 may be satisfied by secret 332 stored in secrets data store 334. The hypervisor 302, the hypervisor-managed secrets compartment and/or the shared secrets management VM instance 320 may provide the mapping between the requests and the secrets that correspond to the requests using, for example, lookup tables, metadata, identification tables and/or other such methods to ensure that the proper secret goes to the proper requester.

Figure 4:
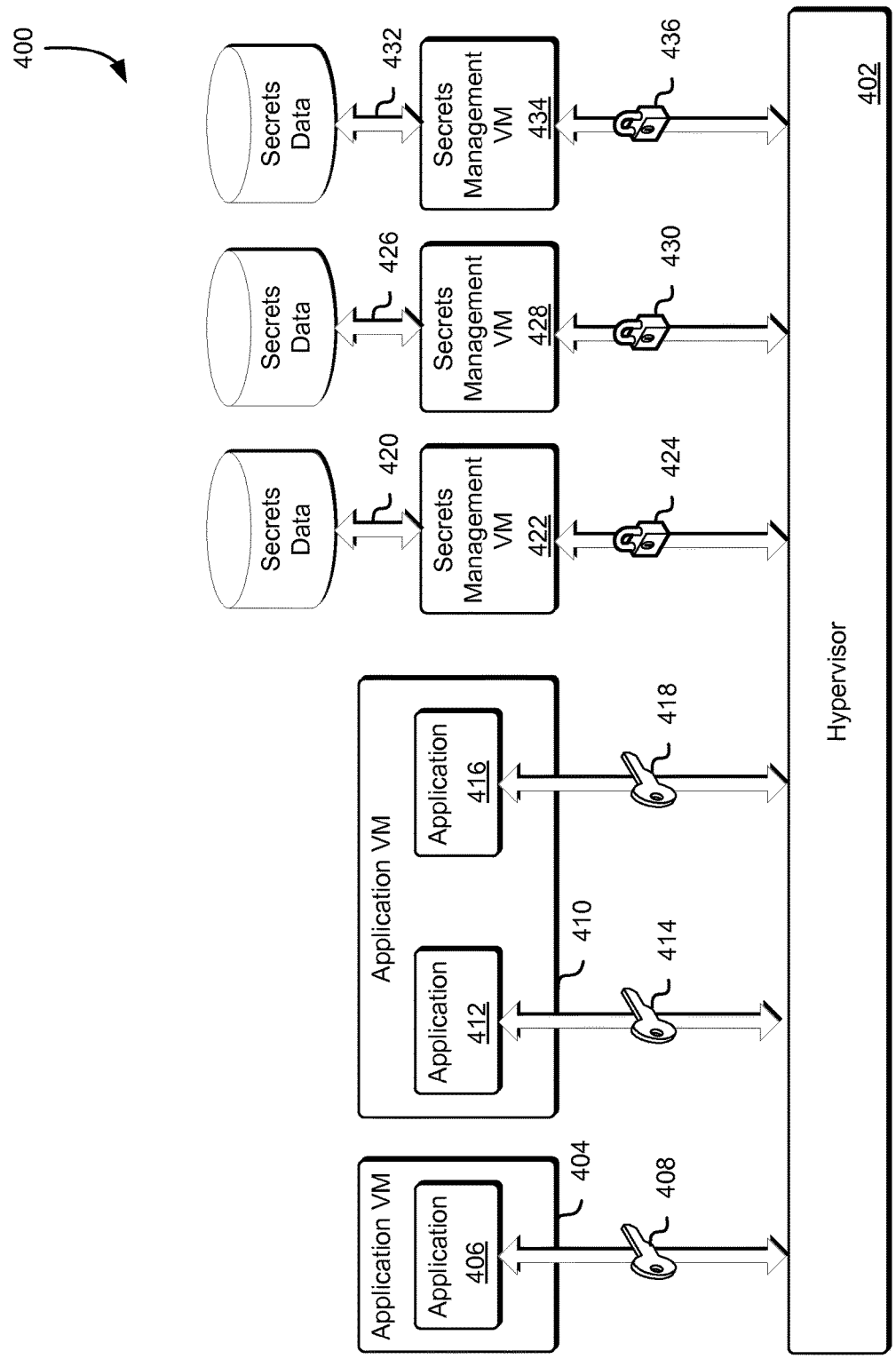
FIG. 4 illustrates an example environment where multiple applications may have secrets requests satisfied in part by one or dedicated secrets virtual machine instances in accordance with at least one embodiment.

FIG. 4 illustrates an example environment 400 where multiple applications which may require access to secrets may be running on a host computer system as described herein at least in connection with FIG. 2 and in accordance with at least one embodiment. Environment 300, described in connection with FIG. 3, illustrates an embodiment where a single secrets management VM instance that is shared by a plurality of applications (a shared secrets management VM instance) is configured to store and/or manage secrets for a plurality of applications running on the host computer system. Environment 400, described in connection with FIG. 4, illustrates an embodiment where each application has a separate lightweight secrets management VM instance.

An application 406 running within an application VM instance 404 that is running under the control of a controlling domain such as a hypervisor 402 and running on a host computer system as described herein at least in connection with FIG. 1 may issue a request 408 for access to one or more secrets. The hypervisor and/or a hypervisor-managed secrets compartment may receive the request, validate the request and, if valid, satisfy the request as described herein at least in connection with FIG. 2 and in accordance with at least one embodiment. The requested secret 424 may be provided to the application 406 by a secrets management VM instance 422 that may be configured to store and/or manage secrets for an application 406 running on the host computer system. The secret 424 corresponding to the request 408 for application 406 may be stored in a secrets data store 420.

As was discussed herein at least in connection with FIG. 3, an application VM instance may be running more than one application that may require secrets. An application VM instance 410 may be running an application 412 and an application 416. Application 412 may issue a request 414 for access to a secret, and application 416 may issue a request 418 for a secret. The hypervisor and/or the hypervisor-managed secrets compartment may validate the requests and then may determine that request 414 may be satisfied by secret 430 stored in secrets data store 426 and serviced by secrets management VM instance 428 and that request 418 may be satisfied by secret 436 stored in secrets data store 432 and serviced by secrets management VM instance 434. The hypervisor 402, the hypervisor-managed secrets compartment and/or the secrets management VM instances 422, 428 and 434 may provide the mapping between the requests and the secrets that correspond to the requests using, for example, lookup tables, metadata, identification tables and/or other such methods to ensure that the proper secret goes to the proper requester.

Figure 5:
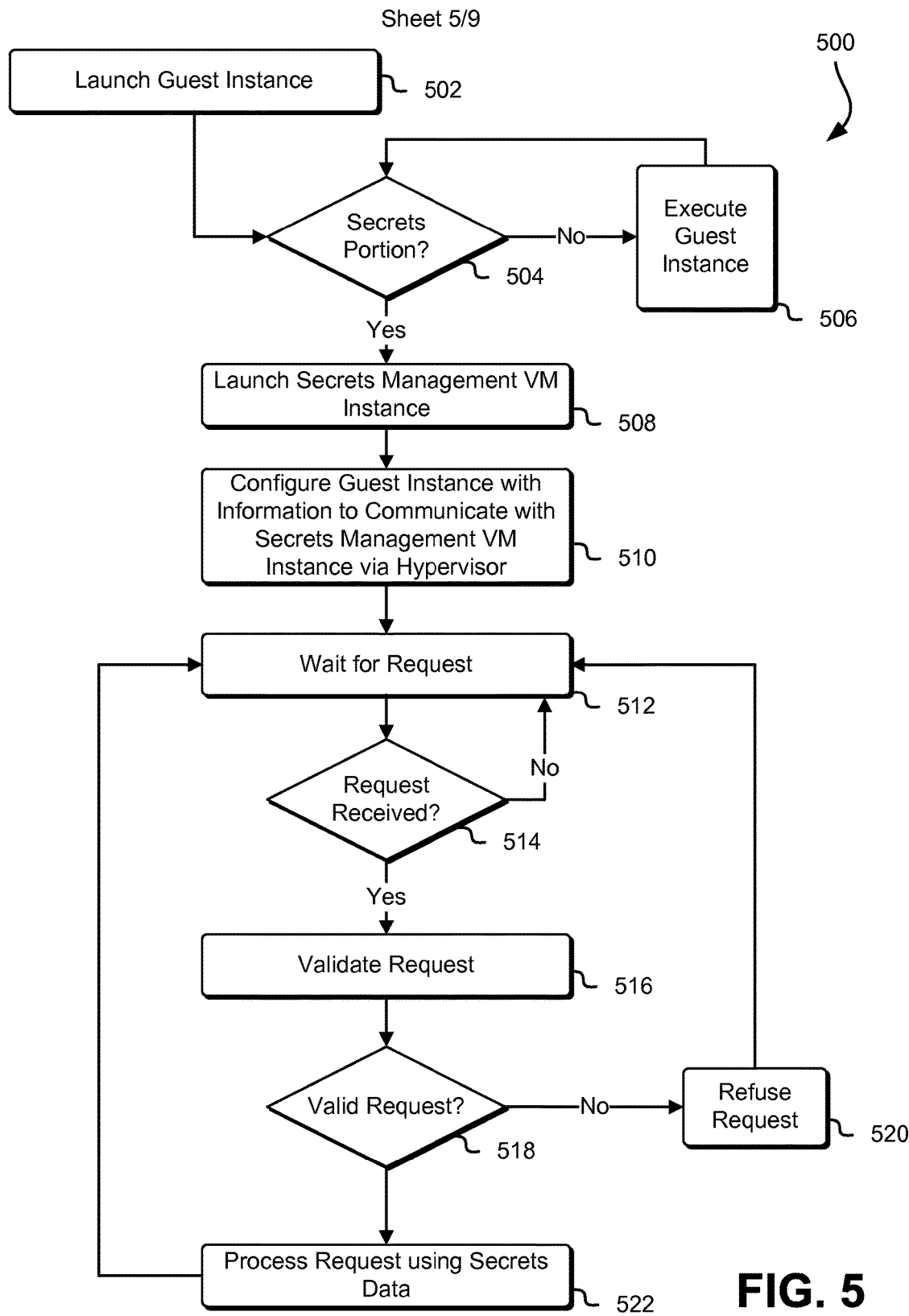
FIG. 5 illustrates an example process for instantiating instances for receiving, validating and satisfying secrets requests in accordance with at least one embodiment.

FIG. 5 illustrates an example process 500 for instantiating instances for receiving, validating and satisfying secrets requests using a hypervisor and/or a hypervisor-managed secrets compartment where the requests come from applications running on VM instances under the control of the hypervisor as described herein at least in connection with FIG. 2 and in accordance with at least one embodiment. A hypervisor, a hypervisor-managed secrets compartment and/or one or more secrets management VM instances such as those described at least in connection with FIG. 2 may perform the process illustrated in FIG. 5.

A hypervisor may launch a guest instance 502 in response to a request from a program, process, service, user and/or other such computer system entity. The hypervisor may then examine the specification for the launched guest instance to determine if the guest instance 502 contains a secret portion 504 if, for example, one or more of the applications on the guest instance may require access to secrets. In some embodiments, the guest instance may be configured with a secret portion 504 at launch time. In some embodiments, the guest instance may be configured to not launch a secrets portion at launch but may request it during execution of the guest instance. If the guest instance is not configured with a secret portion 504 at launch, the guest instance may begin execution 506. During execution 506, the guest instance may determine that it requires a secret portion 504.

If the guest instance is configured for, or later requests a secret portion 504, the hypervisor may then launch a secret management VM instance 508 to store and/or manage secrets on behalf of the application. In some embodiments, the hypervisor may instantiate a secrets management VM instance that is shared by a plurality of applications to store and/or manage secrets on behalf of a plurality of applications as described herein at least in connection with FIG. 3 and in accordance with at least one embodiment. In some embodiments, the hypervisor may instantiate a separate secret instance to store and manage secrets on behalf of a single application and/or a single guest instance as described herein at least in connection with FIG. 4 and in accordance with at least one embodiment. In some embodiments, a hypervisor may use a combination of shared and separate secrets management VM instances according to system needs, application needs, system policy, customer type and/or other such considerations.

After a secrets management VM instance is launched and configured so that it may store and/or manage secrets on behalf of an application, the hypervisor and/or a hypervisor-managed secrets compartment may then configure 510 the guest VM instance with information needed to communicate with the secrets management VM instance via the hypervisor. The hypervisor may, for example, provide the application with a URL or a URI that redirects to a service on the secrets management VM instance. The hypervisor may also provide an application programming interface (API) to the application to issue requests via, for example, system callbacks. The hypervisor may also use the identity of the application and/or the guest VM instance to receive and process requests from the application.

Once configured, the hypervisor may wait for requests 512 from the application and, when a request is received 514 may first validate the request 516. The hypervisor, the hypervisor-managed secrets compartment and/or the secrets management VM instance may validate the request by validating the sender, validating the state of the sender, validating the request contents, validating metadata associated with the request and/or other such validation processes. Once the request is a valid request 518, the secrets management VM instance may process the request 522 using the appropriate secrets data associated with the request before returning to wait for requests 512. If the request is not a valid request 518, the hypervisor and/or the hypervisor-managed secrets compartment may refuse the request 520 and may then return to wait for requests 512.

Figure 6:
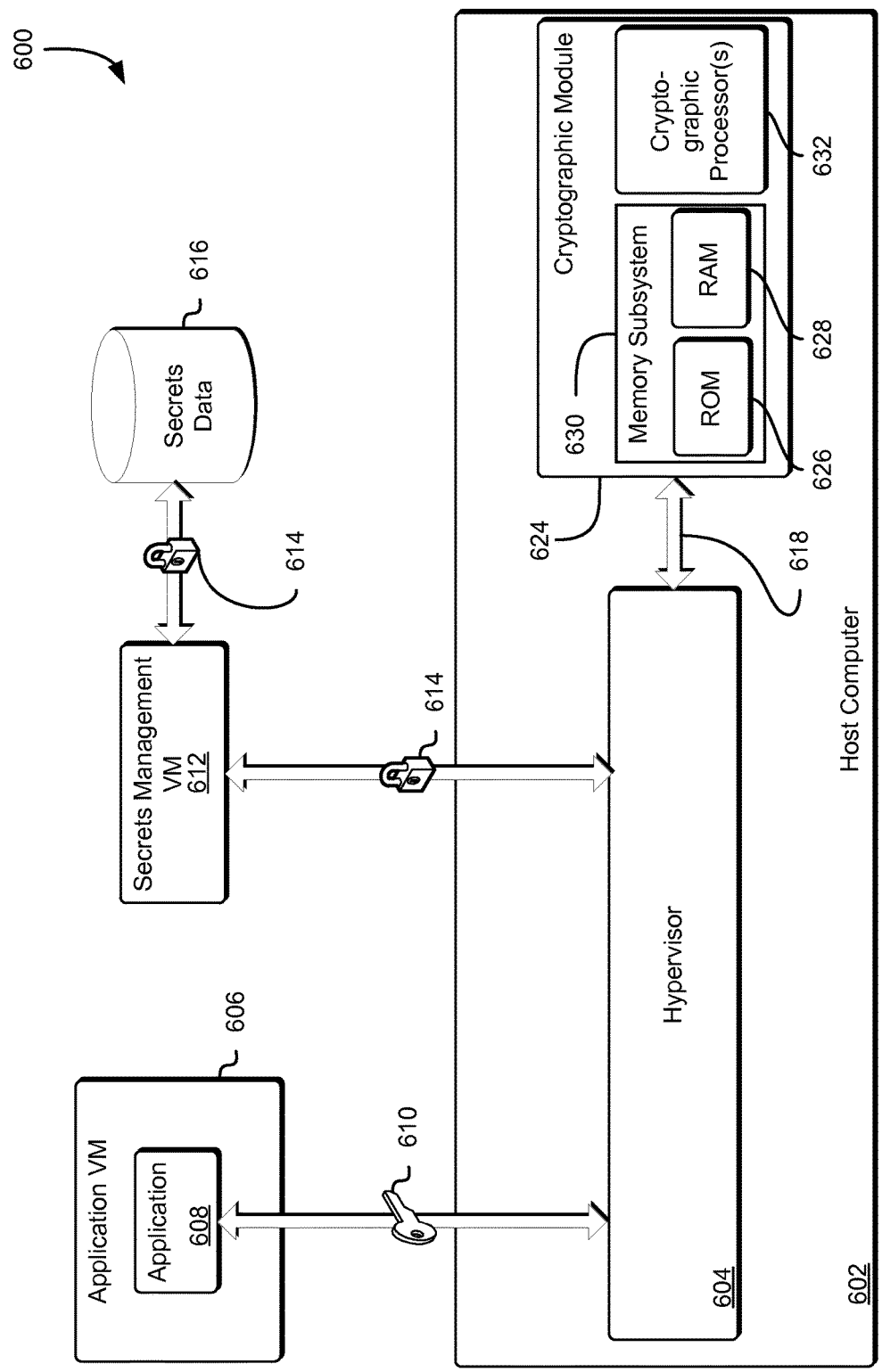
FIG. 6 illustrates an example environment where a controlling domain may utilize system hardware and/or virtualized system hardware to manage secrets on behalf of an application in accordance with at least one embodiment.

FIG. 6 illustrates an example environment 600 where a hypervisor may utilize system hardware and/or virtualized system hardware to manage secrets on behalf of an application running on a guest VM instance as described herein at least in connection with FIG. 2 and in accordance with at least one embodiment. An application 608 running within an application VM instance 606 that is running under the control of a controlling domain such as a hypervisor 604 and running on a host computer system 602 may issue a request 610 for access to one or more secrets. The hypervisor 604 and/or a hypervisor-managed secrets compartment may receive the request, validate the request and, if valid, satisfy the request as described herein at least in connection with FIG. 2 and in accordance with at least one embodiment. The requested secret 614 may be provided to the application 608 by a secrets management VM instance 612. The secret 614 that may be used to satisfy the request 610 from application 608 may be stored in a secrets data store 616.

In some embodiments, the host computer system 602 may contain a cryptographic module 624 which may be used by the secrets management VM instance 612 under the control 618 of the hypervisor 604. The cryptographic module may be a hardware module or may be a virtualized hardware module managed by the hypervisor. The cryptographic module 624, which may be a TPM, an HSM or a smart card, may include a memory subsystem 630, including a main random access memory (RAM) 628 for storage of instructions and data during program execution and a read only memory (ROM) 626, in which fixed cryptographic information may be stored, such as a hardware secret. A computer system may also store keys in RAM 628 and/or processor registers for temporary cryptographic processing. The cryptographic information stored in memory may be used in combination with cryptographic information (e.g., passcode and/or information based at least in part thereon) obtained via a network such as the network described herein at least in connection with FIG. 1 and/or one or more of the computer system client devices such as the computer system client device described herein at least in connection with FIG. 1. The one or more cryptographic processors may be used to perform cryptographic operations in the device and may include a random number generator, SHA-2 or other hash generator and an encryption-decryption-signature engine. Generally, one or more components of the cryptographic module 624 may be configured to collectively perform various operations used in validating data connections, such as described above.

Secrets may be securely stored within the cryptographic module 624 and accessed by the secrets management VM instance 612 via the hypervisor 604. In some embodiments, the hypervisor 604 may provide the secrets management VM instance 612 with shared access to the cryptographic module 624. In some embodiments, the cryptographic module 624 may be implemented as a virtual hardware device by the host computer system or may be implemented as a virtual hardware device within the secrets management VM instance 612.

Figure 7:
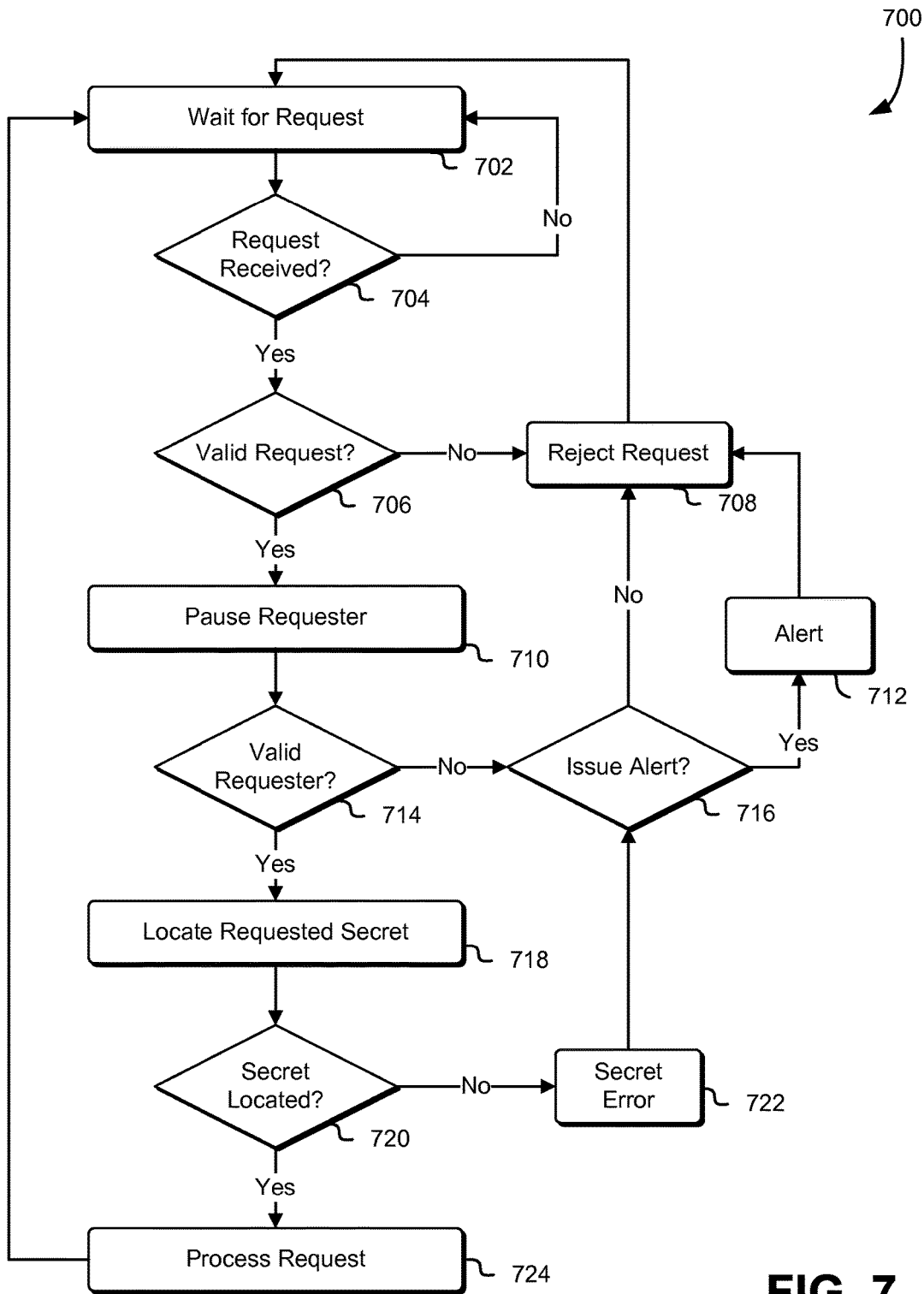
FIG. 7 illustrates an example process for receiving, validating and satisfying requests for secrets from applications running within guest VM instances in accordance with at least one embodiment.

FIG. 7 illustrates an example process 700 for receiving, validating and satisfying requests for secrets from applications running within guest VM instances as described herein at least in connection with FIG. 2 and in accordance with at least one embodiment. A hypervisor, a hypervisor-managed secrets compartment and/or one or more secrets management VM instances such as those described at least in connection with FIG. 2 may perform the process illustrated in FIG. 7. A hypervisor-managed secrets compartment may wait for a request 702 from one or more applications for access to one or more secrets. If a request is received 704, the hypervisor-managed secrets compartment may determine if the request is valid 706. If the request is not valid, the hypervisor-managed secrets compartment may reject the request 708 before returning to wait for a request 702.

If the request is valid 706, the hypervisor-managed secrets compartment may pause the requester 710 in order to validate the request. The hypervisor-managed secrets compartment may pause the requester 710 in order to examine the requester to ensure that the requester and/or the request are valid 714. The hypervisor-managed secrets compartment may, for example, examine a stack trace of the requesting application and may compare it to a known stack trace and/or a hash value of the same, or may examine the processes of the virtual machine that the requesting application is running for any unexpected processes or may examine one or more other such aspects of the requester to determine whether the requesting application and the guest virtual machine are running in a known state, without unexpected conditions.

If the requester and/or the request are not valid 714, the hypervisor-managed secrets compartment may determine if it should issue an alert 716 and if so, may alert 712 the host computer system and/or the hypervisor, may reject the request 708 and may then return to wait for a request 702. If the requester and/or the request are valid 714, the hypervisor-managed secrets compartment may next attempt to locate the requested secret 718. If the requested secret is not located 720, the hypervisor-managed secrets compartment may issue a secret error 722 before determining if it should issue an alert 716, then the hypervisor-managed secrets compartment may reject the request 708 and return to wait for a request 702. Finally, if the requested secret is located 720, the hypervisor-managed secrets compartment may return to wait for a request 702.

Figure 8:
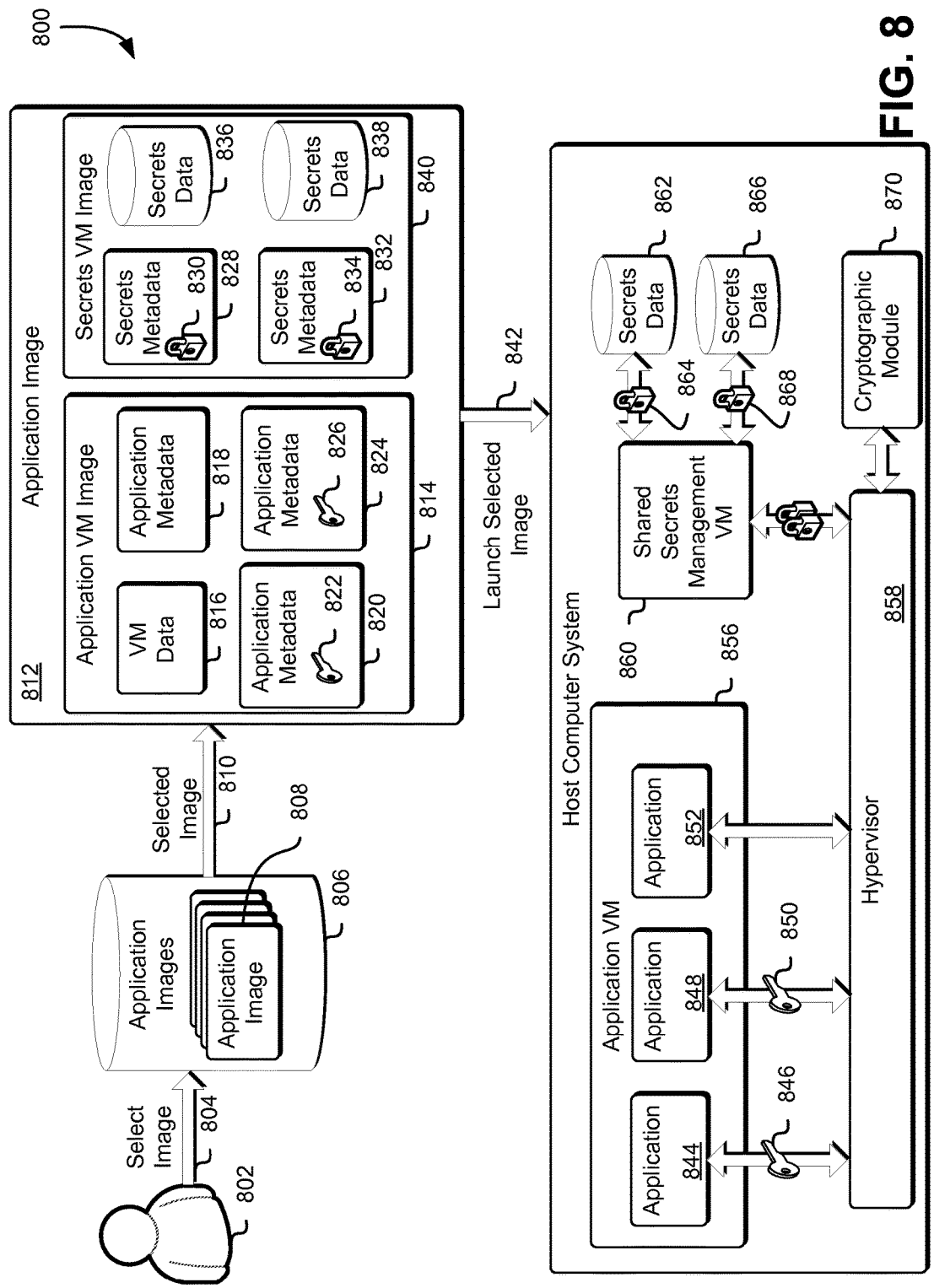
FIG. 8 illustrates an example environment where virtual machine images may be launched from one or more application images for applications that may require secrets in accordance with at least one embodiment.

FIG. 8 illustrates an example environment 800 where an application VM image and a secrets management VM image may be launched from one or more application images to support applications that may require secrets as described herein at least in connection with FIG. 2 and in accordance with at least one embodiment. A user 802 may select an application image 804 from a data store of application images 806 containing a plurality of application images 808. The selected image 810 may be an application image 812 which may contain an application VM image 814 and a secrets management VM image 840. The application VM image may contain VM data 816 which may be used to instantiate the VM image, application metadata 818 for an application that does not require secrets, application metadata 820 for an application that requires secrets 822 and application metadata 824 for another application that requires secrets 826. The secrets management VM image 840 may contain secret metadata 828 with secrets metadata 830 which may correspond to secret 822 and a secrets data store 836. The secrets management VM image 840 may also contain secret metadata 832 with secrets metadata 834 which may correspond to secret 826 and a secrets data store 838.

When the command to launch the selected image 842 is issued by the hypervisor, the application VM instance 856 may be launched with the three applications 844, 848 and 852. Application 844 may be launched based on application metadata 820, and a secret request 846 from application 844 may correspond to secret 822. Application 848 may be launched based on application metadata 824, and a secret request 850 from application 848 may correspond to secret 826. Application 852 may be launched based on application metadata 818, without any corresponding secrets. A hypervisor 858 and/or a hypervisor-managed secrets compartment may respond to secret request 846 and secret request 850 using a shared secrets management VM instance 860 as described herein at least in connection with FIG. 2 and in accordance with at least one embodiment. The shared secrets management VM instance 860 may be configured to provide secret 864 from secrets data store 862 in response to secret request 846 from application 844 corresponding to secrets metadata 830. Secrets data store 862 may correspond to secrets data store 836 from secrets management VM image 840. The shared secrets management VM instance 860 may also be configured to provide secret 868 from secrets data store 866 in response to secret request 850 from application 848 corresponding to secrets metadata 834. Secrets data store 866 may correspond to secrets data store 838 from secrets management VM image 840. In some embodiments, the hypervisor 858 may use a cryptographic module 870 to facilitate the functionality of the shared secrets management VM instance 860 as described herein at least in connection with FIG. 6 and in accordance with at least one embodiment.

Figure 9:
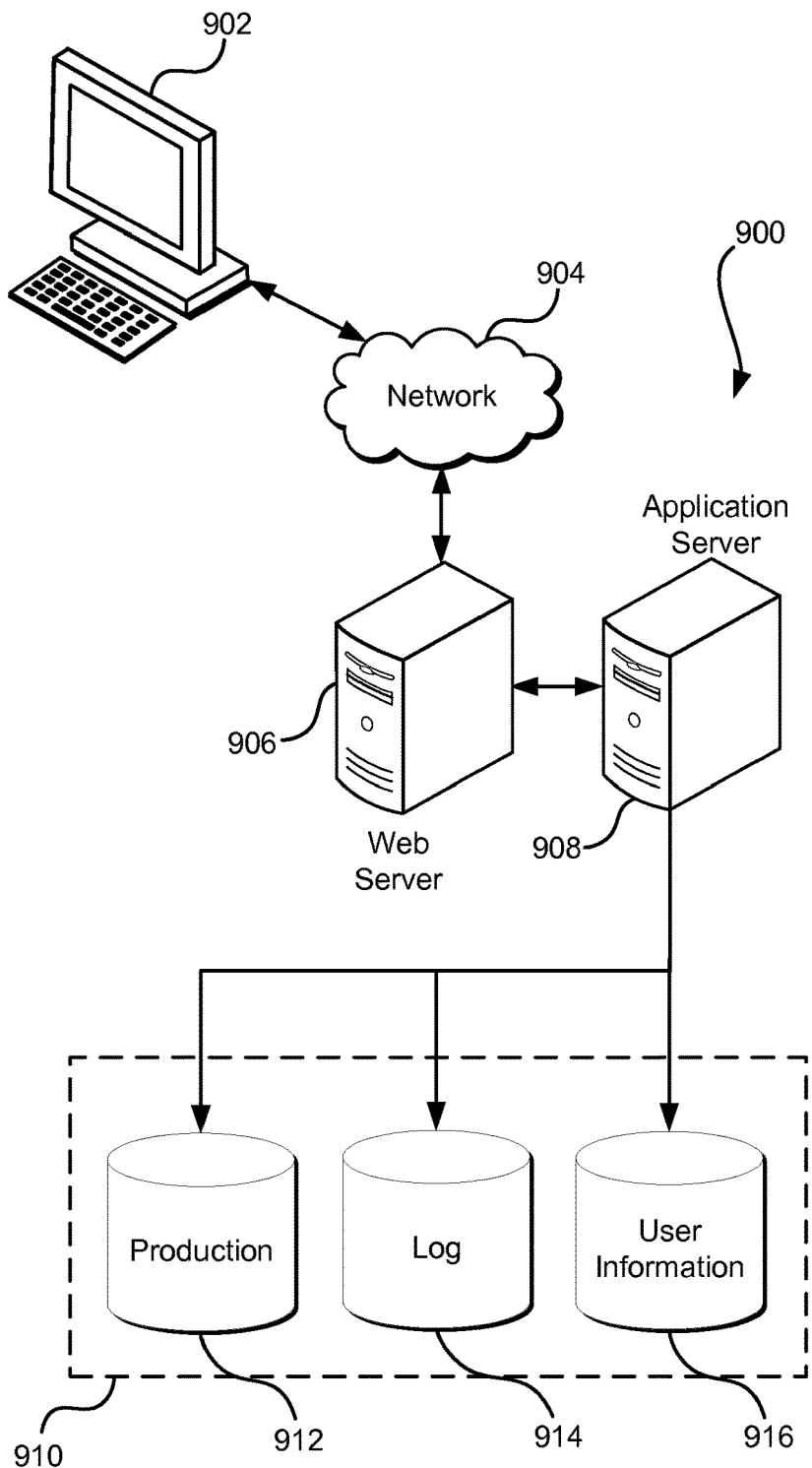
FIG. 9 illustrates an environment in which various embodiments can be implemented.

FIG. 9 illustrates aspects of an example environment 900 for implementing aspects in accordance with various embodiments. As will be appreciated, although a web-based environment is used for purposes of explanation, different environments may be used, as appropriate, to implement various embodiments. The environment includes an electronic client device 902, which can include any appropriate device operable to send and/or receive requests, messages or information over an appropriate network 904 and, in some embodiments, convey information back to a user of the device. Examples of such client devices include personal computers, cell phones, handheld messaging devices, laptop computers, tablet computers, set-top boxes, personal data assistants, embedded computer systems, electronic book readers and the like. The network can include any appropriate network, including an intranet, the Internet, a cellular network, a local area network, a satellite network or any other such network and/or combination thereof. Components used for such a system can depend at least in part upon the type of network and/or environment selected. Protocols and components for communicating via such a network are well known and will not be discussed herein in detail.

Communication over the network can be enabled by wired or wireless connections and combinations thereof. In this example, the network includes the Internet, as the environment includes a web server 906 for receiving requests and serving content in response thereto, although for other networks an alternative device serving a similar purpose could be used as would be apparent to one of ordinary skill in the art.

The illustrative environment includes at least one application server 908 and a data store 910. It should be understood that there can be several application servers, layers or other elements, processes or components, which may be chained or otherwise configured, which can interact to perform tasks such as obtaining data from an appropriate data store. Servers, as used herein, may be implemented in various ways, such as hardware devices or virtual computer systems. In some contexts, servers may refer to a programming module being executed on a computer system. As used herein, unless otherwise stated or clear from context, the term "data store" refers to any device or combination of devices capable of storing, accessing and retrieving data, which may include any combination and number of data servers, databases, data storage devices and data storage media, in any standard, distributed, virtual or clustered environment. The application server can include any appropriate hardware, software and firmware for integrating with the data store as needed to execute aspects of one or more applications for the client device, handling some or all of the data access and business logic for an application. The application server may provide access control services in cooperation with the data store and is able to generate content including, but not limited to, text, graphics, audio, video and/or other content usable to be provided to the user, which may be served to the user by the web server in the form of HyperText Markup Language ("HTML"), Extensible Markup Language ("XML"), JavaScript, Cascading Style Sheets ("CSS") or another appropriate client-side structured language. Content transferred to a client device may be processed by the client device to provide the content in one or more forms including, but not limited to, forms that are perceptible to the user audibly, visually and/or through other senses including touch, taste, and/or smell. The handling of all requests and responses, as well as the delivery of content between the client device 902 and the application server 908, can be handled by the web server using PHP: Hypertext Preprocessor ("PHP"), Python, Ruby, Perl, Java, HTML, XML or another appropriate server-side structured language in this example. It should be understood that the web and application servers are not required and are merely example components, as structured code discussed herein can be executed on any appropriate device or host machine as discussed elsewhere herein. Further, operations described herein as being performed by a single device may, unless otherwise clear from context, be performed collectively by multiple devices, which may form a distributed and/or virtual system.

The data store 910 can include several separate data tables, databases, data documents, dynamic data storage schemes and/or other data storage mechanisms and media for storing data relating to a particular aspect of the present disclosure. For example, the data store illustrated may include mechanisms for storing production data 912 and user information 916, which can be used to serve content for the production side. The data store also is shown to include a mechanism for storing log data 914, which can be used for reporting, analysis or other such purposes. It should be understood that there can be many other aspects that may be stored in the data store, such as page image information and access rights information, which can be stored in any of the above listed mechanisms as appropriate or in additional mechanisms in the data store 910. The data store 910 is operable, through logic associated therewith, to receive instructions from the application server 908 and obtain, update or otherwise process data in response thereto. The application server 908 may provide static, dynamic or a combination of static and dynamic data in response to the received instructions. Dynamic data, such as data used in web logs (blogs), shopping applications, news services and other such applications may be generated by server-side structured languages as described herein or may be provided by a content management system ("CMS") operating on, or under the control of, the application server. In one example, a user, through a device operated by the user, might submit a search request for a certain type of item. In this case, the data store might access the user information to verify the identity of the user and can access the catalog detail information to obtain information about items of that type. The information then can be returned to the user, such as in a results listing on a web page that the user is able to view via a browser on the user device 902. Information for a particular item of interest can be viewed in a dedicated page or window of the browser. It should be noted, however, that embodiments of the present disclosure are not necessarily limited to the context of web pages, but may be more generally applicable to processing requests in general, where the requests are not necessarily requests for content.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment, in one embodiment, is a distributed and/or virtual computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 9. Thus, the depiction of the system 900 in FIG. 9 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop, laptop or tablet computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network. These devices also can include virtual devices such as virtual machines, hypervisors and other virtual devices capable of communicating via a network.

Various embodiments of the present disclosure utilize at least one network that would be familiar to those skilled in the art for supporting communications using any of a variety of commercially-available protocols, such as Transmission Control Protocol/Internet Protocol ("TCP/IP"), User Datagram Protocol ("UDP"), protocols operating in various layers of the Open System Interconnection ("OSI") model, File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, a satellite network and any combination thereof.

In embodiments utilizing a web server, the web server can run any of a variety of server or mid-tier applications, including Hypertext Transfer Protocol ("HTTP") servers, FTP servers, Common Gateway Interface ("CGI") servers, data servers, Java servers, Apache servers and business application servers. The server(s) also may be capable of executing programs or scripts in response to requests from user devices, such as by executing one or more web applications that may be implemented as one or more scripts or programs written in any programming language, such as Java®, C, C# or C++, or any scripting language, such as Ruby, PHP, Perl, Python or TCL, as well as combinations thereof. The server(s) may also include database servers, including without limitation those commercially available from Oracle®, Microsoft®, Sybase® and IBM® as well as open-source servers such as MySQL, Postgres, SQLite, MongoDB, and any other server capable of storing, retrieving and accessing structured or unstructured data. Database servers may include table-based servers, document-based servers, unstructured servers, relational servers, non-relational servers or combinations of these and/or other database servers.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU" or "processor"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs, such as a client application or web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as, but not limited to, volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the invention to the specific form or forms disclosed, but on the contrary, the intention is to cover all modifications, alternative constructions and equivalents falling within the spirit and scope of the invention, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including" and "containing" are to be construed as open-ended terms (i.e., meaning "including, but not limited to,") unless otherwise noted. The term "connected," when unmodified and referring to physical connections, is to be construed as partly or wholly contained within, attached to or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. The use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of the corresponding set, but the subset and the corresponding set may be equal.

Conjunctive language, such as phrases of the form "at least one of A, B, and C," or "at least one of A, B and C," unless specifically stated otherwise or otherwise clearly contradicted by context, is otherwise understood with the context as used in general to present that an item, term, etc., may be either A or B or C, or any nonempty subset of the set of A and B and C. For instance, in the illustrative example of a set having three members, the conjunctive phrases "at least one of A, B, and C" and "at least one of A, B and C" refer to any of the following sets: {A}, {B}, {C}, {A, B}, {A, C}, {B, C}, {A, B, C}. Thus, such conjunctive language is not generally intended to imply that certain embodiments require at least one of A, at least one of B and at least one of C each to be present.

Operations of processes described herein can be performed in any suitable order unless otherwise indicated herein or otherwise clearly contradicted by context. Processes described herein (or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory.

The use of any and all examples, or exemplary language (e.g., "such as") provided herein, is intended merely to better illuminate embodiments of the invention and does not pose a limitation on the scope of the invention unless otherwise claimed. No language in the specification should be construed as indicating any non-claimed element as essential to the practice of the invention.

Preferred embodiments of this disclosure are described herein, including the best mode known to the inventors for carrying out the invention. Variations of those preferred embodiments may become apparent to those of ordinary skill in the art upon reading the foregoing description. The inventors expect skilled artisans to employ such variations as appropriate and the inventors intend for embodiments of the present disclosure to be practiced otherwise than as specifically described herein. Accordingly, the scope of the present disclosure includes all modifications and equivalents of the subject matter recited in the claims appended hereto as permitted by applicable law. Moreover, any combination of the above-described elements in all possible variations thereof is encompassed by the scope of the present disclosure unless otherwise indicated herein or otherwise clearly contradicted by context.

All references, including publications, patent applications and patents, cited herein are hereby incorporated by reference to the same extent as if each reference were individually and specifically indicated to be incorporated by reference and were set forth in its entirety herein.

What is claimed is:

1. A system, comprising: memory to store instructions that, if executed by one or more processors of the system, cause the system to: identify, by a hypervisor, secured data stored in a first virtual machine, the secured data being accessible by the first virtual machine, without support from a guest operating system, using a key; generate, by the hypervisor, a communication channel between the first virtual machine and a second virtual machine, wherein the second virtual machine is generated with metadata selected based on at least in part on an application instantiated on the first virtual machine, wherein the second virtual machine has access to a repository of keys; store, by the hypervisor, the key to the second virtual machine; receive, by the hypervisor, a request to access the secured data; and provide, by the hypervisor through the communication channel, in response to the request, the key for access to the secured data.

2. The system of claim 1, wherein the second virtual machine is shared by a plurality of applications.

3. The system of claim 2, wherein each application has a corresponding second virtual machine.

4. The system of claim 1, wherein a cryptographic module is a hardware security module connected to the system.

5. The system of claim 1, wherein a cryptographic module is a virtual hardware security module running on the second virtual machine.

6. The system of claim 1, wherein one or more application programming interface calls are made by the application running on the first virtual machine to the hypervisor to obtain the key for access to the secured data.

7. The system of claim 1, wherein the second virtual machine is instantiated by selecting, based at least in part on the application running on the first virtual machine, a virtual machine configuration from a set of one or more virtual machine configurations.

8. The system of claim 1, wherein the instructions, if executed by one or more processors of the system, further cause the system to validate a state of the first virtual machine by validating that one or more states of one or more processes running on the first virtual machine conform to one or more corresponding predicted states of the one or more processes comprises examining a call stack of the application running on the first virtual machine.

9. The system of claim 8, wherein examining the call stack comprises verifying that at least a portion of the call stack matches a corresponding portion of one of a set of one or more predicted call stacks.

10. The system of claim 8, wherein examining the call stack comprises verifying that the call stack only includes executable code from modules that are members of a computer system determined set of permitted applications.

11. The system of claim 8, wherein examining the call stack comprises verifying that the call stack does not include executable code from modules that are members of a computer system determined set of restricted applications.

12. The computer-implemented method of claim 1, wherein the key is secured by a cryptographic module.

13. The computer-implemented method of claim 1, wherein one or more application programming interface calls are made by the application in the first virtual machine to the hypervisor to obtain the key for access to the secured data.

14. The computer-implemented method of claim 1, further comprising: one or more services on the first virtual machine to perform one or more operations on behalf of the application using the key.

15. The computer-implemented method of claim 1, further comprising: causing the hypervisor to provide the application running on the first virtual machine with a uniform resource identifier that at least identifies a service on the second virtual machine wherein the service on the second virtual machine at least provides access to the key.

16. The computer-implemented method of claim 1, further comprising: causing the hypervisor to provide the second virtual machine with an identifier of the application.

17. A non-transitory computer-readable storage medium having collectively stored thereon executable instructions that, as a result of being executed by one or more processors of a computer system, cause the computer system to at least: instantiate, by a hypervisor, a first virtual machine to store secured data, the secured data is specifically accessible by the first virtual machine, without support from a guest operating system, using a key; establish, by the hypervisor, a communication channel between the first virtual machine and a second virtual machine, wherein the second virtual machine is generated with metadata selected based on at least in part on an application instantiated on the first virtual machine, wherein the second virtual machine has access to a repository of keys; cause, by the hypervisor, the second virtual machine to store the key; and provide, by the hypervisor through the communication channel, in response to a request to access the secured data, the key for access to the secured data.

18. The non-transitory computer-readable storage medium of claim 17, wherein the key is secured by a cryptographic module.

19. The non-transitory computer-readable storage medium of claim 17, wherein one or more application programming interface calls are made by an application in the first virtual machine to the hypervisor to obtain the key for access to the secured data.

20. The non-transitory computer-readable storage medium of claim 17, further includes instructions that cause the computer system to cause one or more services on the first virtual machine to perform one or more operations on behalf of an application using the key.

21. The non-transitory computer-readable storage medium of claim 17, further includes instructions that cause the computer system to cause the hypervisor to provide an application running on the first virtual machine with a uniform resource identifier that at least identifies a service on the second virtual machine wherein the service on the second virtual machine at least provides access to the key.

22. The non-transitory computer-readable storage medium of claim 17, further includes instructions that cause the computer system to cause the hypervisor to provide the second virtual machine with an identifier of an application.

23. The non-transitory computer-readable storage medium of claim 17, further includes instructions that cause the computer system to cause the hypervisor to provide the second virtual machine with access to a repository of keys.

\* \* \* \* \*